United States Patent
Kanamaru et al.

(10) Patent No.: US 7,888,596 B2
(45) Date of Patent: Feb. 15, 2011

(54) SEALING STRUCTURE OF ELECTRICAL JUNCTION BOX

(75) Inventors: Masahiro Kanamaru, Shizuoka-ken (JP); Makoto Nakayama, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 673 days.

(21) Appl. No.: 11/965,266

(22) Filed: Dec. 27, 2007

(65) Prior Publication Data

US 2008/0156807 A1 Jul. 3, 2008

(30) Foreign Application Priority Data

Dec. 27, 2006 (JP) ............................. P2006-352299

(51) Int. Cl.
*H02G 3/08* (2006.01)

(52) U.S. Cl. ........................ 174/50; 174/17 R; 174/520; 174/539; 220/3.2; 220/378; 439/76.1; 439/76.2

(58) Field of Classification Search .................... 174/50, 174/53, 57, 58, 59, 17 R, 520, 559, 560, 564; 220/3.2–3.9, 4.02, 200, 378; 439/76.1, 76.2, 439/949, 535, 563, 573
See application file for complete search history.

(56) References Cited

FOREIGN PATENT DOCUMENTS

JP       2005-130585       5/2005

*Primary Examiner*—Angel R Estrada
(74) *Attorney, Agent, or Firm*—Finnegan, Henderson, Farabow, Garrett & Dunner, L.L.P.

(57) ABSTRACT

In an upper surface of a bottom wall of a box body having a part accommodation room formed inside, a recess is provided. In the bottom of the recess, a bolt hole to fix an electrical junction box to a vehicle body is penetrated. In the upper surface of the bottom wall of the body hole, a flat sealing surface is formed to surround an opening of the recess. When an electronic unit is accommodated in the part accommodation room, the bottom surface of the electronic unit is brought into close contact with the sealing surface to close the recess, thus providing a seal between the part accommodation room and recess.

4 Claims, 4 Drawing Sheets

SEALING STRUCTURE OF ELECTRICAL JUNCTION BOX

BACKGROUND OF THE INVENTION

1. Field of the Invention

The present invention relates to a sealing structure of an electrical junction box accommodating electrical parts and the like.

2. Description of the Related Art

Japanese Patent Laid-open Publication No. 2005-130585 discloses a technique of a sealing structure preventing water intrusion through a bolt hole. In this sealing structure, a bolt hole is provided for a bottom wall of a box body facing a vehicle body panel, and a ring-shaped lip for waterproofing is protruded in a lower surface of the bottom wall of the box unit so as to surround the bolt hole. The box body is fixed to the vehicle body panel by fastening a bolt inserted into the bolt hole. The tip of the lip for waterproofing is pressed and flattened to bring the box body into close contact with the vehicle body panel, thus preventing water intrusion through the bolt hole.

In the aforementioned conventional sealing structure, the tip of the lip is pressed and flattened when the box body is fixed to the vehicle body to secure sealability. Accordingly, the sealability can be reduced because of degradation in the attached condition of the box body due to aging or the like. The sealing structure can secure high sealability when the box body is mounted once. However, demounting and mounting the box body again can reduce the repeatablity of the sealing, thus resulting in low waterproof reliability.

SUMMARY OF THE INVENTION

In the light of the aforementioned circumstances, an object of the present invention is to provide a sealing structure of the electrical junction box capable of maintaining highly reliable sealing performance with a simple structure.

An aspect of the present invention is a sealing structure of an electrical junction box, including: a box body including a part accommodation room inside thereof; a recess provided in an upper surface of a bottom wall of the box body; a bolt hole penetrated in a bottom of the recess, through which a bolt fixing the box body to a vehicle body is inserted; and a flat sealing surface formed in the upper surface of the bottom wall of the box body to surround an opening of the recess. When a part is accommodated in the part accommodation room of the box body, a bottom surface of the part is brought into close contact with the sealing surface to close the recess to provide a seal between the part accommodation room and recess.

According to the above-described constitution, accommodating the part at a predetermined position is only required to close the recess having the bolt hole formed in the bottom thereof and prevent water intrusion through the bolt hole. In this case, the bolt hole itself is not sealed, but the opening of the recess with the bolt hole formed in the bottom thereof is closed with the bottom surface of the part. Accordingly, it is not necessary to provide a special sealing member, a sealing lip, or the like, and it is only necessary to form the flat sealing surface, with which the bottom surface of the part is brought into close contact, on the inner bottom wall of the box body. It is therefore possible to obtain necessary sealing performance without extra cost. Moreover, since the sealing is not secured by pressing and flattening the sealing lip unlike the conventional electrical junction box, the sealability cannot be affected even if the attached condition is degraded by aging and the like. The waterproof reliability can be therefore increased.

In addition to the aforementioned structure, the bottom wall of the box body may be inclined to secure space under the box body, and the recess and sealing surface may be formed in the upper surface of the inclined bottom wall. Preferably, when a box-shaped electronic unit as the part is placed on the inclined bottom wall, a bottom surface of the electronic unit is brought into close contact with the sealing surface to close the recess to provide a seal between the part accommodation room and recess.

According to the aforementioned constitution, it is possible to make a space under the box body. By arranging the bolt fixing portion in the space, the electrical junction box can be mounted at a position where the box body is very close to a member of the vehicle body (for example, a tire house or the like) without an increase in mounting height.

Still furthermore, in the aforementioned sealing structure of the electrical junction box, the bolt hole may be composed of an slot.

According to the aforementioned constitution, a bolt provided for the vehicle body can be easily inserted into the bolt hole even when the bolt hole and a bolt provided for the vehicle body (for example, a stud or the like) are difficult to position. This can facilitate mounting of the electrical junction box.

DETAILED DESCRIPTION OF THE EMBODIMENT

Figure 1:
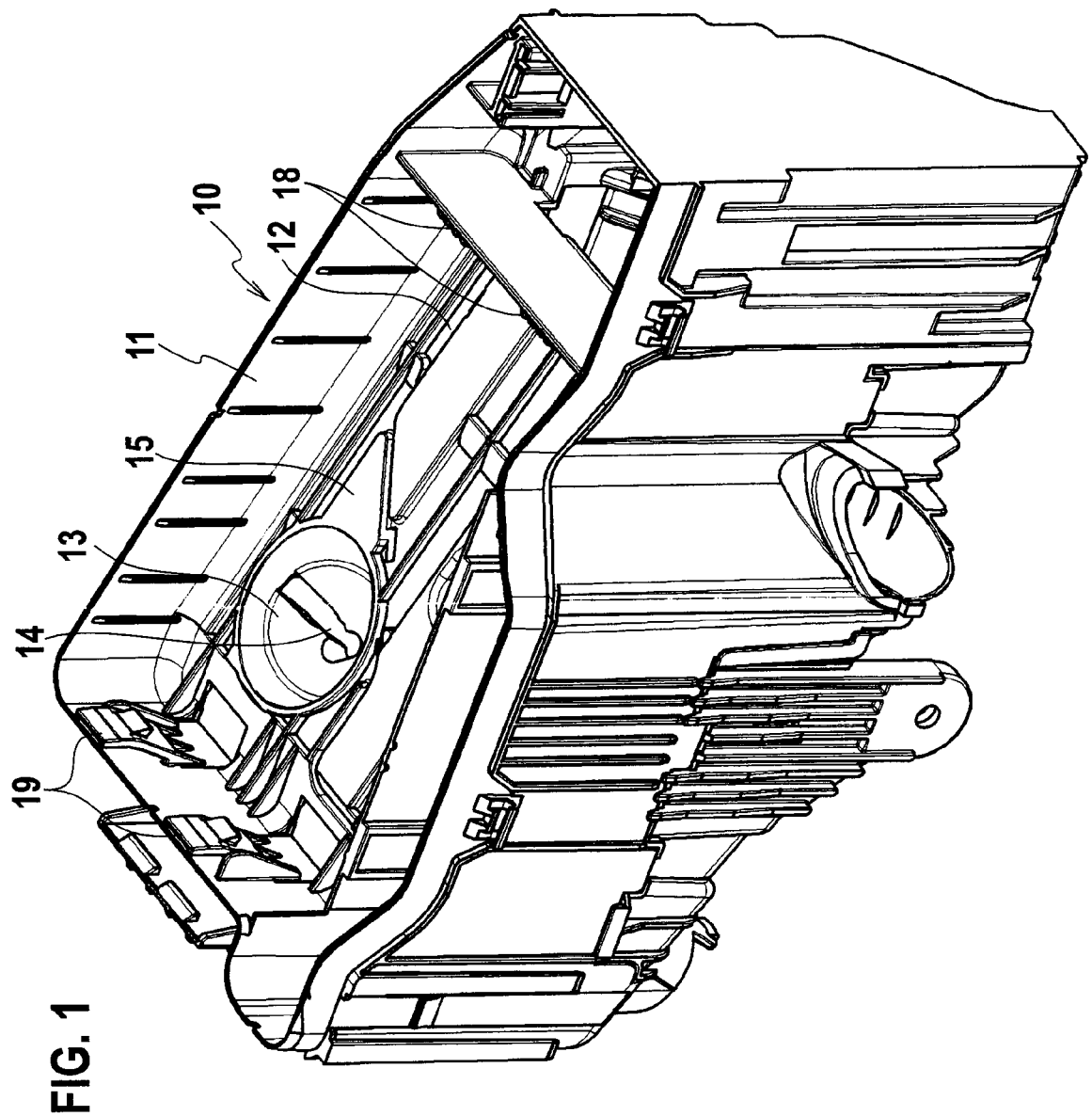
FIG. 1 is a perspective view of an electrical junction box according to an embodiment of the present invention, showing the electrical junction box when an electronic unit is not mounted.
Figure 2:
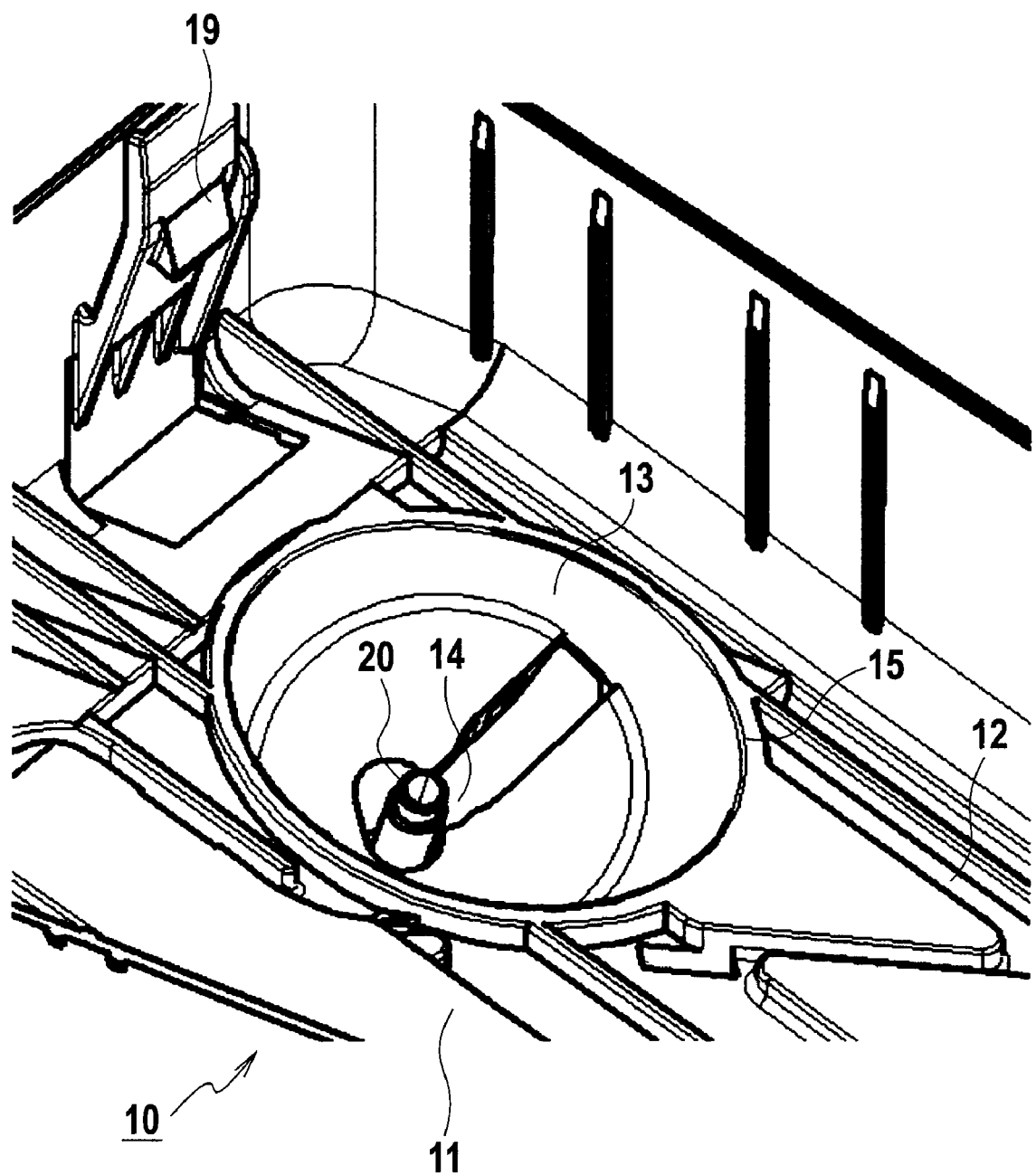
FIG. 2 is an enlarged view of a main portion of FIG. 1.
Figure 3:
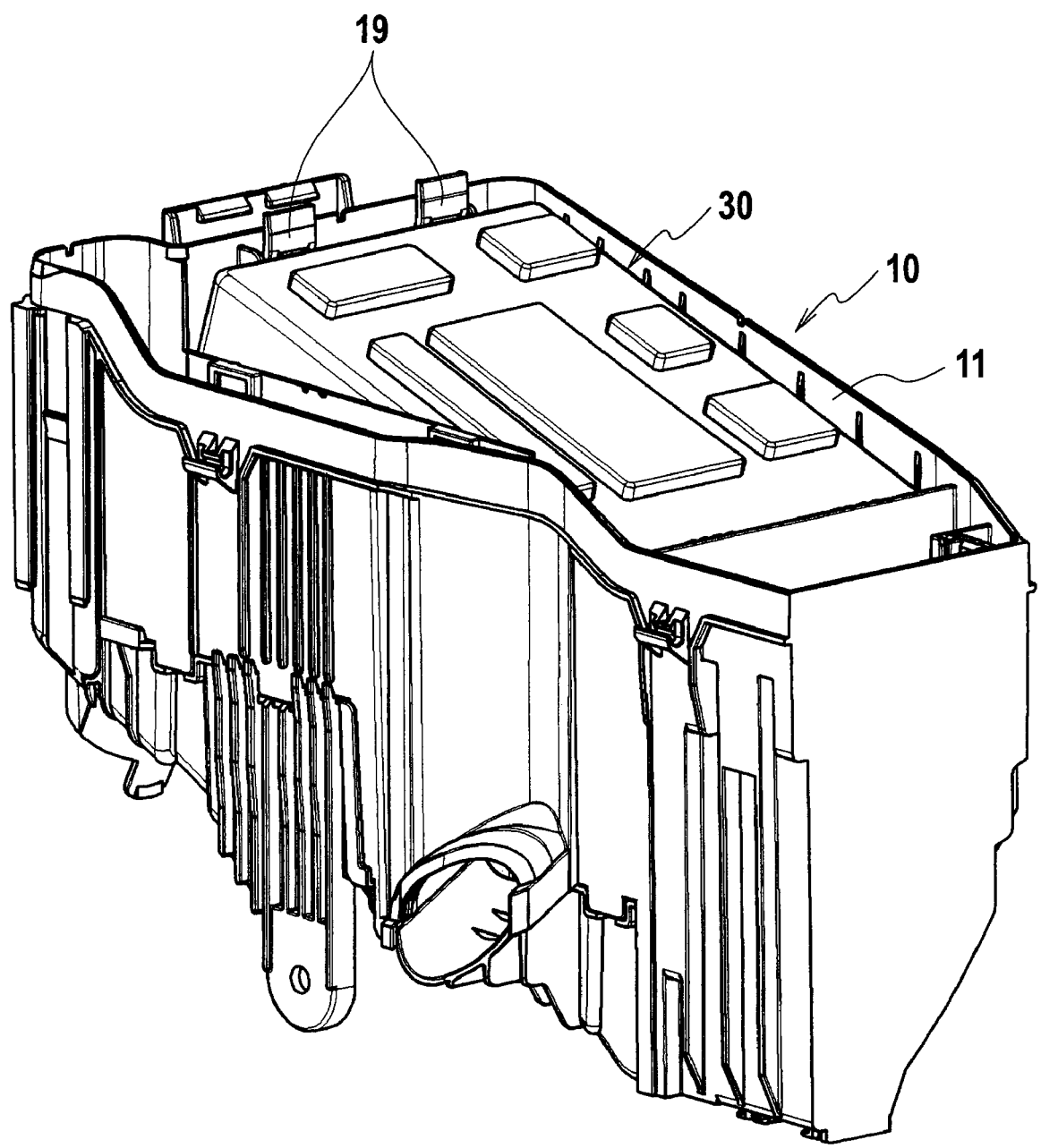
FIG. 3 is a perspective view of the electrical junction box of FIG. 1 with the electronic unit mounted in a box body.
Figure 4:
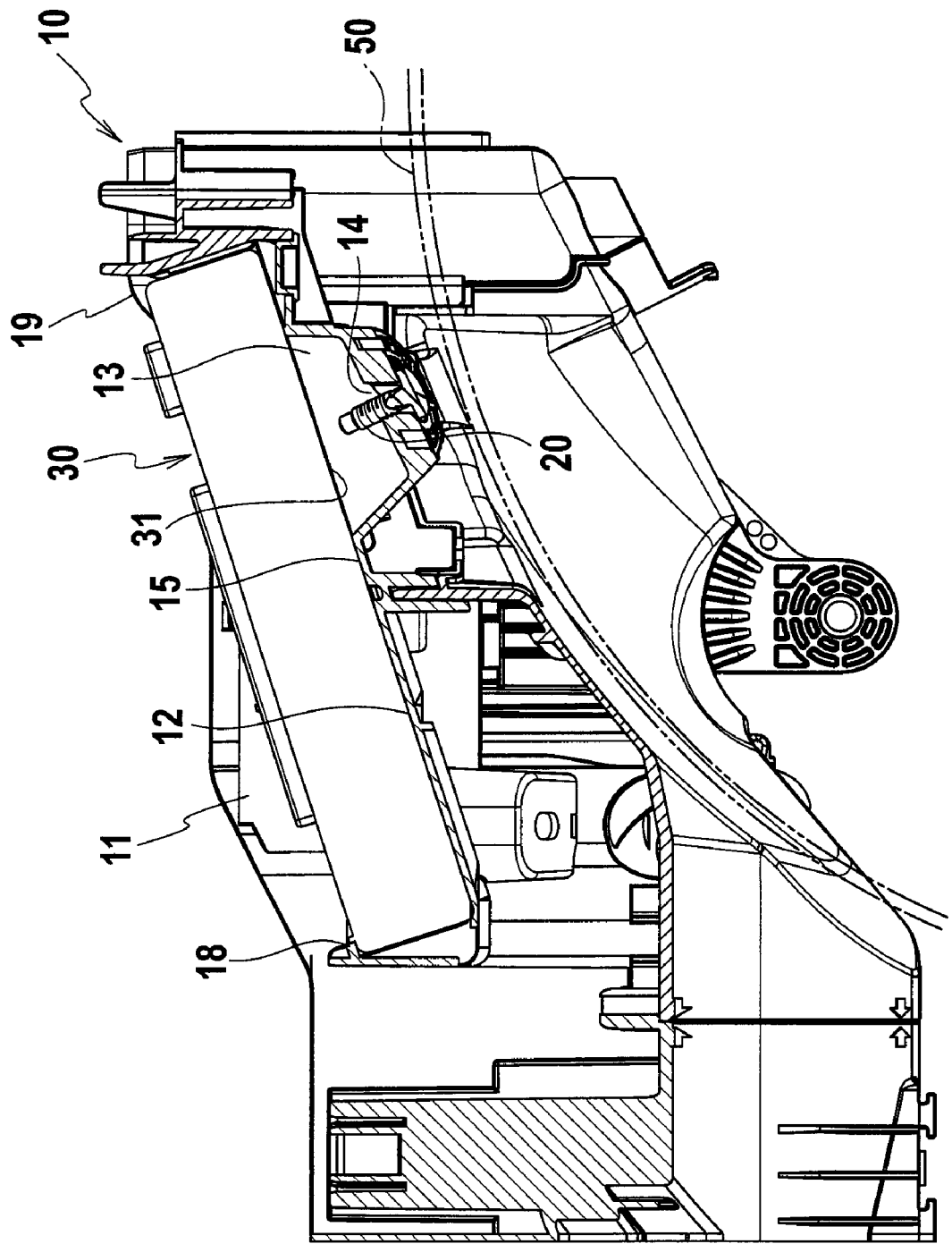
FIG. 4 is a cross-sectional side view of FIG. 3.

A description is given of an embodiment of the present invention below with reference to the drawings.

The electrical junction box includes: a box body 10 which is made of resin and has a part accommodation room 11 inside; and an electronic unit (a part) 30 which is placed on a bottom wall 12 of the box body 10. The electronic unit 30 includes a bottom surface 31 composed of a smooth flat plane. In the electronic unit 30 as a circuit component, various electronic parts are mounted in a rectangular box-shaped casing.

The bottom wall 12 of the box body 10 is inclined to secure space under the box body 10. In the upper surface of the inclined bottom wall 12, a recess 13 as a vehicle body mounting portion is provided. In the bottom of the recess 13, a bolt hole 14 is formed as a though hole. The bolt hole 14 is an slot so that a stud 20 provided on a vehicle panel 50 is easily inserted therethrough.

In the upper surface of the bottom wall 12 of the box body 10, a flat sealing surface 15 is formed so as to surround an opening of the recess 13. The box body 10 includes lock units 18 and 19 to lock the electronic unit 30 when the box body 10 accommodates the electronic unit 30.

To mount the electrical junction box to a vehicle, first, the stud 20 provided on the vehicle panel 50 is inserted into the bolt hole 14, and a nut (not shown) is fastened to the tip of the stud 20 in the recess 13. The box body 10 is thus fixed to the vehicle body 10. Next, the electronic unit 30 is accommodated in the part accommodation room 11 and placed on the inclined bottom wall 12. The bottom surface 31 of the electronic unit 30 is brought into close contact with the sealing surface 15 to close the opening of the recess 13. Such close contact provides a seal between the part accommodation room 11 and recess 13.

As described above, only by accommodating the electronic unit 30 at a predetermined position within the box body 10, the recess 13 can be closed to prevent water intrusion through the bolt hole 14. In this case, the bolt hole 14 itself is not sealed, but the opening of the recess 13 including the bolt hole 14 in the bottom thereof is closed by the bottom surface 31 of the electronic unit 30. Accordingly, it is not necessary to provide a special sealing member, a sealing lip, or the like but only necessary to form the flat sealing surface 15, which is brought into close contact with the bottom surface 31 of the electronic unit 30, in the upper surface of the bottom wall 12 of the box body 10. It is therefore possible to obtain necessary sealing performance without extra cost. Moreover, it is not necessary to press and flatten the sealing lip for sealing like a conventional electrical junction box. Accordingly, even if the electrical junction box is repeatedly mounted and demounted, or even if the attached condition is degraded because of aging or the like, the sealability is not affected at all. The waterproof reliability can be therefore increased.

In this embodiment, the bottom wall 12 of the box body 10 is inclined, and the electronic unit 30 is placed on the bottom wall 12 and inclined with respect to the horizontal. Accordingly, a space can be provided under the box body 10. In this case, a portion which fixes the bolt can be situated in the space, so that the electrical junction box can be mounted without an increase in mounting height even in a place where the body panel 50 (a tire house, or the like) is very close to the box body 10.

In this embodiment, the bolt hole 14 is an slot, so that the stud 20 provided for the vehicle body can be easily inserted into the bolt hole 14 even when the stud 20 of the vehicle body and the bolt hole 14 are difficult to position. This can facilitate the mounting of the electrical junction box.

In the above embodiment, the bottom wall 12 of the box body 10 is inclined. However, the bottom wall 12 is not necessarily inclined when there is an enough space secured under the electrical junction box.

What is claimed is:

1. A sealing structure of an electrical junction box, comprising:
    a box body including a part accommodation room inside thereof;
    a recess provided in an upper surface of a bottom wall of the box body;
    a bolt hole penetrated in a bottom of the recess, through which a bolt fixing the box body to a vehicle body is inserted; and
    a flat sealing surface formed in the upper surface of the bottom wall of the box body to surround an opening of the recess, wherein
    when a part is accommodated in the part accommodation room of the box body, a bottom surface of the part is brought into close contact with the sealing surface to close the recess to provide a seal between the part accommodation room and recess.

2. The sealing structure of the electrical junction box according to claim 1, wherein
    the bottom wall of the box body is inclined to secure space under the box body, and the recess and sealing surface are formed in the upper surface of the inclined bottom wall, and
    when a box-shaped electronic unit as the part is placed on the inclined bottom wall, a bottom surface of the electronic unit is brought into close contact with the sealing surface to close the recess, providing a seal between the part accommodation room and recess.

3. The sealing structure of the electrical junction box according to claim 1, wherein
    the bolt hole is composed of an slot.

4. The sealing structure of the electrical junction box according to claim 2, wherein
    the bolt hole is composed of an slot.

* * * * *

UNITED STATES PATENT AND TRADEMARK OFFICE
CERTIFICATE OF CORRECTION

| | | |
|---|---|---|
| PATENT NO. | : 7,888,596 B2 | Page 1 of 1 |
| APPLICATION NO. | : 11/965266 | |
| DATED | : February 15, 2011 | |
| INVENTOR(S) | : Masahiro Kanamaru et al. | |

It is certified that error appears in the above-identified patent and that said Letters Patent is hereby corrected as shown below:

In claim 3, column 4, line 36, "an slot." should read --a slot.--.

In claim 4, column 4, line 39, "an slot." should read --a slot.--.

Signed and Sealed this

Thirty-first Day of May, 2011

David J. Kappos
*Director of the United States Patent and Trademark Office*